(12) United States Patent
Gong et al.

(10) Patent No.: US 8,449,778 B2
(45) Date of Patent: May 28, 2013

(54) BALLAST WATER TREATMENT METHOD

(75) Inventors: Terry R. Gong, Moraga, CA (US);
Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 345 days.

(21) Appl. No.: 12/932,364

(22) Filed: Feb. 23, 2011

(65) Prior Publication Data

US 2012/0211440 A1    Aug. 23, 2012

(51) Int. Cl.
*C02F 1/70* (2006.01)

(52) U.S. Cl.
USPC .................. 210/747.6; 210/757; 210/764

(58) Field of Classification Search
USPC ................ 210/747.5, 747.6, 757, 764, 242.1
See application file for complete search history.

(56) References Cited

U.S. PATENT DOCUMENTS

2009/0127207 A1 * 5/2009 Okamoto et al. ............. 210/747

OTHER PUBLICATIONS

Juliet Scott, "What lurks beneath: Bay Area's battle with invasive species in ballast water" Dec. 1, 2010 Contra Costa Times.
James T. Carlton, "Ballast Water & Exotic Species", Endangered Species Update vol. 12, 1995.

* cited by examiner

*Primary Examiner* — Lucas Stelling
(74) *Attorney, Agent, or Firm* — Marcus G. Theodore

(57) ABSTRACT

A method for treating ballast water with sulfurous acid to kill invasive species and remove oxygen from the ballast water to preserve hulls from rusting.

6 Claims, No Drawings

BALLAST WATER TREATMENT METHOD

BACKGROUND OF THE INVENTION

This invention pertains to water treatment methods. More particularly it relates to a method for treating ballast water with sulfurous acid to kill invasive species and remove oxygen from the ballast water to preserve hulls from rusting.

STATEMENT OF THE ART

Ballast water refers to the water ships take on for stability and trim before a voyage. Upon arrival at a destination, ships often release the ballast water into the new bay. Ballast water is primarily comprised of water and is full of stones, sediment, and thousands of living species. As used herein, ballast water may also include grey water or other waters generated onboard, which are discharge along with ballast water upon arrival.

Release of this ballast also releases thousands of invasive exotic marine animals and plants into American coastal water. In the last quarter of the 19th century, commercial oysters began to be moved around the world in huge numbers. With them came an untold number of epizoic and endozoic species, as well as entire estuarine communities in the mud and seaweed packed with these oysters. The world's oceans began to be biologically homogenized centuries ago. Yet, despite the successful movement of hundreds of species over these decades, the speed of modern ships and the volume of ballast water now carried are two of several factors that may be in the process of successfully overwhelming these earlier centuries of transport in terms of the number of successful invasions. Invasive species have recently been discovered because of their detrimental economic impact in the Great Lakes causing billions of dollars of damage. Other means of exotic species introduction include the aquarium trade, military, recreational marine vessels, research institutions, seafood commodity distribution.

The problem with invasive species is that they feed on native species eliminating vital parts of native food chains. Often the invasive nonindigenous species cause economic and environmental damage The Contra Costa Times article "What lurks beneath: Bay Area's battle with invasive species in ballast water" by Julia Scott posted Dec. 1, 2010, outlines the problems of removing organisms and invasive species in ballast water from ships loading ad unloading in a harbor; jscott@bayareanewsgroup.com:

Ballast water balances a ship and requires a treatment system to remove organisms thinner than the width of a hair to meet state deadlines to remove exotic species from ballast water discharge—or face stiff penalties.

The shipping industry brings 8.4 million metric tons of cargo into California each year, but vessels also unload unwelcome stowaways: exotic species that catch a ride in the ballast water that ships pick up at sea. Local scientists say more of these species have invaded the bay-Delta estuary than anywhere else in the world—and some are very destructive.

"An invasive species, once it's established, and once it starts to reproduce, it's there forever," said Maurya Falkner, head of the State Lands Commission's Marine Invasive Species Program. The commission has spent more than $400,000 since 2006 to find technological solutions to the ballast discharge problem—including the system installed on the Moku Pahu by Boston-based Ecochlor.

California recently set the nation's strictest standards for discharge of ballast water from newly constructed ships, standards that would prohibit even the smallest organisms from escaping into coastal or inland waters.

It would affect ships built after 2012, which won't be delivered until 2014 at the earliest, and existing ships don't have to comply with the law until 2020. About 700 ships discharge ballast water in California each year, and 5 percent of the fleet is replaced each year.

Despite a lengthy phase-in, the push to achieve such a high standard is making those in the shipping industry nervous. This summer, the shippers seized on a review of 46 ballast water treatment systems that concluded none can achieve the state standard 100 percent of the time, although at least eight systems have demonstrated the "potential" to comply.

One system to kill these nonindigenous species from ballast water uses chlorine dioxide, which is an unstable compound that disinfects the water and then dissolves into a harmless gas within hours. Unfortunately chlorine dioxide may form carcinogenic chlorocompounds and is an oxidizing agent, which is corrosive to ship hulls. To offset the galvanic action of these types of oxidizing compounds, sacrificial anodes are often attached to the hull.

Other systems use ultraviolet light similar to that used in advanced wastewater treatment, or chemicals or onshore filters to clean the water, but are energy intensive.

There thus remains a need for a ballast water treatment, which kills nonindigenous species in ballast water, before dumping and preserves ship hulls without costly painting, plating, or sacrificial anodes.

The method described below provides such an invention.

BRIEF SUMMARY OF THE INVENTION

The present invention comprises injecting sufficient sulfurous acid into ballast water containing nonindigenous invasive species, alkaline and oxygen compounds to lower the pH and provide free $SO_2$, sulfites and bisulfites to kill the invasive species, and provide a reducing agent to minimize hull oxidation corrosion.

The pH selected varies upon the dwell exposure time required for kill of the invasive species. For rapid 10 minute kill, a pH of less than 2 is required. When longer dwell times are possible, an elevated pH of up to 4.5 may be used for longer kill. The amount of acid is therefore dependent upon the buffering alkalinity of the ballast water, with more sulfurous acid required first to neutralize buffering bicarbonates in the ballast water before the neutralized pH is lowered to that required for kill.

In addition, more sulfurous acid may be required to remove excessive oxygen contained in the ballast water. By reducing oxygen levels in the ballast water the need for sacrificial anodes for corrosion control is reduced, thereby lightening loads.

The method is used just before discharge of the ballast water, or it may be employed during transport to provide a reducing environment inside the hull to prevent corrosion.

Before discharge of the sulfurous acid treated ballast water, it may be necessary to raise its pH to not interfere with native animal and plant species. For pH adjustment, usually an environmentally compatible alkaline agent, such as lime, is used. However, this step is usually not necessary where the volume of the surrounding waters is sufficient to dilute the acid to that required for environmental disposal.

The $SO_2$ may be carried in tanks or generated on site using a sulfur burner to provide the volume of sulfurous acid as needed.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

We claim:

1. A method for killing non indigenous invasive species and reducing alkaline and oxygen compounds contained within ballast water comprising:
   a. injecting sufficient sulfurous acid into the ballast water to:
      i. remove alkalinity and lower the pH to provide acid, sulfites and bisulfites to kill the invasive species in the ballast water, and
      ii. provide a sulfite and bisulfite and free $SO_2$ reducing agents to minimize ballast water hull oxidation corrosion; and
   b. holding the sulfurous acid treated ballast water for a dwell time required to kill the invasive species before discharge.

2. A method for killing non indigenous invasive species and reducing alkaline and oxygen compounds contained within ballast water according to claim 1, wherein the pH is lowered to 1.5 to 4.5.

3. A method for killing non indigenous invasive species and reducing alkaline and oxygen compounds contained within ballast water according to claim 1, including raising the pH of the sulfurous acid treated ballast water with an alkaline agent to a level required to prevent environmental damage to surrounding flora and fauna before discharge.

4. A method for killing non indigenous invasive species and reducing alkaline and oxygen compounds contained within ballast water according to claim 3, wherein the pH is raised with lime.

5. A method for killing non indigenous invasive species and reducing alkaline and oxygen compounds contained within ballast water according to claim 1, wherein the sulfurous acid is injected during transport to provide a reducing environment inside a hull to prevent oxidation corrosion.

6. A method for killing non indigenous invasive species and reducing alkaline and oxygen compounds contained within ballast water according to claim 1, wherein the amount of sulfurous acid injected is dependent upon the buffering alkalinity and oxygen levels in the ballast water.

* * * * *